United States Patent [19]

Speranza et al.

[11] Patent Number: 5,030,710

[45] Date of Patent: Jul. 9, 1991

[54] NYLON-6 MODIFIED WITH LOW MOLECULAR WEIGHT POLYETHYLENE GLYCOL DIAMINES

[75] Inventors: George P. Speranza; Wei-Yang Su, both of Austin, Tex.

[73] Assignee: Texaco Chemical Company, White Plains, N.Y.

[21] Appl. No.: 506,989

[22] Filed: Apr. 10, 1990

[51] Int. Cl.$^5$ ............................................. C08G 69/14
[52] U.S. Cl. ................................. 528/324; 528/329.1
[58] Field of Search ............................. 528/324, 329.1

[56] References Cited

U.S. PATENT DOCUMENTS

| | | | |
|---|---|---|---|
| 3,044,987 | 7/1962 | Schaefgen et al. | 260/75 |
| 3,454,534 | 7/1969 | Crovatt | 260/78 |
| 4,044,071 | 8/1977 | Nickol | 260/857 TW |
| 4,045,511 | 8/1977 | Nickol | 260/857 TW |
| 4,113,794 | 9/1978 | Thompson et al. | 260/857 TW |
| 4,130,602 | 12/1978 | Thompson | 260/857 TW |
| 4,136,133 | 1/1979 | Thompson | 260/857 TW |
| 4,297,454 | 10/1981 | Thompson | 525/432 |
| 4,581,440 | 4/1986 | Coquard et al. | 528/324 |

FOREIGN PATENT DOCUMENTS

| | | | |
|---|---|---|---|
| 0163902 | 12/1985 | European Pat. Off. | |
| 1108812 | 4/1968 | United Kingdom | 528/324 |

OTHER PUBLICATIONS

R. A. Lofquist, et al., "Hydrophilic Nylon for Improved Apparel Comfort", *Textile Research Journal,* Jun. 1985, pp. 325–333.

*Primary Examiner*—Harold D. Anderson
*Attorney, Agent, or Firm*—Jack H. Park; Kenneth R. Priem; David L. Mossman

[57] ABSTRACT

Novel modified nylon-6 may be produced by using a combination of one or more dicarboxylic acids and triethylene glycol diamine and tetraethylene glycol diamine, but not a diethylene glycol diamine. A dicarboxylic acid/polyethylene glycol diamine salt may be reacted with $\epsilon$-caprolactam to provide the modified nylon-6. The diamines have the formula $NH_2$—$(CH_2CH_2O)_x$—$CH_2CH_2$—$NH_2$, where x ranges from 2 to 3. Surprisingly, the suitable diamines include triethylene glycol diamine (x=2; JEFFAMINE® EDR-148 Amine) and tetraethylene glycol diamine (x=3; JEFFAMINE® EDR-192 Amine), but not closely related bis-aminoethyl ether (x=1; BAEE). Unexpectedly, BAEE, which only differs from JEFFAMINE EDR-148 Amine by one —13 ($CH_2CH_2O$)—group, did not give satisfactory product—the fibers were too weak. The resulting modified nylon-6 polymers of the invention, however, including fibers therefrom, have improved water absorbancy properties and greater flexibility. Polyamide products with a wide range of water adsorbancies may be obtained by adjusting the amount of amide.

18 Claims, No Drawings

NYLON-6 MODIFIED WITH LOW MOLECULAR WEIGHT POLYETHYLENE GLYCOL DIAMINES

CROSS-REFERENCES TO RELATED APPLICATIONS

This application is related to U.S. patent application Ser. No. 07/507,261, filed of even date, relating to novel polyether amides made from polyethylene glycol diamines and dicarboxylic acids, and methods therefor.

FIELD OF THE INVENTION

The invention relates to novel polyamides, and, in one aspect, more particularly relates to novel polyamides, particularly nylons, having polyether groups prepared by the reaction of dicarboxylic acids with polyethylene glycol diamines.

BACKGROUND OF THE INVENTION

It is well known that polyamides such as nylon-5, nylon-6, nylon-8, and nylon-12 have been produced by ring-opening polymerization of appropriate lactams. Nylon-6, also called polycaprolactam, was originated by I. G. Farbenindustrie in 1940. In one preparation technique, the polymerization of ε-caprolactam (also known as ε-aminocaprolactam or simply caprolactam), is carried out by adding water to open the ring and then removing water again at elevated temperature, where linear polymer forms. ε-Caprolactam may also be polymerized by ionic chain mechanisms.

Nylon-6 has properties similar to nylon-66, but has a lower crystalline melting point and is somewhat softer and less stiff. The major use for the polymer is in tire cord. Polycaprolactam accounts for about 25% of U.S. consumption of nylon.

Nylon-6 has been modified to improve its properties. See, for example, R. A. Lofquist, et al., "Hydrophilic Nylon for Improved Apparel Comfort," *Textile Research Journal*, June 1985, pp. 325-333 which teaches that a cotton-like moisture absorption level can be achieved by incorporating a telechelic water soluble segment, such as an amine-terminated polyethylene oxide (PEOD), into the nylon backbone, or grafting onto the nylon chain a low molecular weight poly(-dimethylacryl-amide) (PDMAA). The JEFFAMINE ® ED-Series amines were used as the amine-terminated polyethylene oxide glycols to produce a modified nylon-6. These amines are high molecular weight (600 to 2000) alkylene glycol diamines having the formula $H_2NRNH_2$, where the radical R is a polyoxyalkylene chain of molecular weight of from about 200 to about 4000 having terminal carbon atoms to which nitrogen atoms are bonded. Moisture absorption was found to be greatest using the amines having the highest molecular weight.

See also European Patent 0 163 902 A1 which relates to high polymeriza-tion degree polyetheresteramides having no gelated materials and superior color tones. These polyamides are apparently quickly obtained through the polycondensing interaction carried out between (a) one or more than two polyamide forming components selected from lactams and aminocarboxylic acids as well as the salts of substantially equal quantities of diamines and dicarboxylic acid, and (b) the polyetherester forming components consisting of substantially equal quantities of dicarboxylic acids and poly(alkylene oxide) glycols, in the presence of 0.001 to 0.5 percent by weight of the mixtures composed of antimony oxides-/organic tin compounds, and more preferably, in the co-presence of 0.0005 to 0.5 percent by weight of phosphoric compounds.

U.S. Pat. No. 3,454,534 indicates that the hydrophilic characteristics of nylon 66 may be improved by adding a polyakylene glycol diamine to the molten polymer prior to spinning. The process involves producing polyhexamethylene adipamide where equimolar proportions of adipic acid and hexamethylene diamine are reacted together to form molten polyhexamethylene adipamide. The improvement involved introducing from about 0.3 to 3.0 weight percent of a polyalkylene glycol diamine into the molten polymer subsequent to polymer formation and prior to spinning. The polyalkylene glycol diamine has the formula: $H_2N-(CH_2)_3-O-[R-O]_x-(CH_2)_3-NH_2$ where R is an alkylene hydrocarbon radical having a chain length of from 2 to about 8 carbon atoms, and x is an integer sufficiently large to confer a molecular weight of at least 1000. Note that propylene linkages are required and that the polyalkylene glycol diamine must have a molecular weight of at least 1000.

A new class of linear nitrogen-containing copolymers and especially elastic products are described in U.S. Pat. No. 3,044,987. The substantially linear segmented copolymer consists of a multiplicity of intralinear segments of two classes connected by ester linkages, where the segments of the first class are the residues remaining after removal of the terminal ester-forming functional groups selected from the group consisting of hydroxyl, thiol, carboxyl, and acid halide from a difunctional polymer. The segments of the second class contain at least one repeating unit of a fiber-forming polymer, including a radical containing terminal nitrogens. The diamines suggested in this patent do not contain ether linkages.

Block copolymers of poly(oxa-amide) and polyamide are described in U.S. Pat. Nos. 4,113,794; 4,130,602 and 4,136,133. The '794 patent discusses novel copolymers formed by melt blending a melt spinnable polyamide, such as nylon-6, and a block of random poly(dioxaamide), such as a copolymer prepared from the mixture of caprolactam and the salt of adipic acid and 4,7-dioxadecamethylene diamine. Block copolymers formed by melt blending a melt spinnable polyamide such as nylon-6 and a poly(dioxa-amide) such as poly(4,7-dioxadecamethylene adipamide) is disclosed in the '602 patent. The '133 patent teaches block copolymers formed by melt blending a melt spinnable polyamide such as nylon-6 and a poly(oxa-amide) such as poly(4-oxaheptamethylene adipamide). As examples only, in the '133 patent, the poly(oxa-amide) groups have the formula:

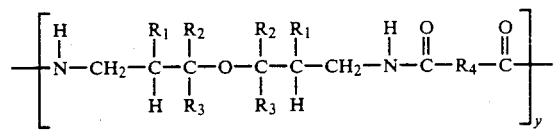

where $R_1$, $R_2$ and $R_3$ are hydrogen, $C_1$-$C_{10}$ alkyls and $C_3$-$C_{10}$ isoalkyls; $R_4$ is selected from the group consisting of $C_0$-$C_{10}$ alkylenes and $C_3$-$C_{10}$ isoalkylenes, where y may range from 4 to 200. All of these materials are noted to have utility as fibers.

U.S. Pat. Nos. 4,044,071 and 4,045,511 describe methods for making the copolymers discussed in the previous paragraph. The '071 patent teaches a process for forming block copolymers by mixing a dry salt of a prepolyamide and a molten melt-spinnable polyamide. The mixture is heated to a temperature in the range of between the melting point of the higher melting component of the mixture to below the amide-interchange temperature of a blend of the melt-spinnable polyamide and the homopolymer which would result from the polymerization of the salt. Mixing and heating is continued until substantially all of the salt and the polyamide are converted into a block copolymer. The '511 patent teaches a similar process, but one that is lower in energy and uses a blend of dry particles of a melt-spinnable polyamide, rather than using the polyamide in the molten state.

Finally, U.S. Pat. No. 4,297,454 teaches a method for preparing a block copolymer of an ether-free polylactam and a polyetheramide, e.g., poly(4,7-dioxadecamethylene adipamide) involving polymerizing a lactam, e.g., caprolactam, in contact with the polyetheramide. At least one of the lactam and the polyetheramide are molten during the lactam polymerization and block copolymer formation. The materials prepared appear similar to those described in U.S. Pat. Nos. '794; '602 and '133, described above. Examples of polyetheramides mentioned in the '454 patent include poly(4,7-dioxadecamethylene adipamide), poly(4,7-dioxadecamethylene sebacamide), poly(4,9-dioxadodecamethylene adipamide), poly(4,8-dioxa-6,6-dimethylundecamethylene adipamide), poly(4,7-dioxa-2,9-dimethyldodecamethylene adipamide), poly(4,7-dioxadecamethylene-2-methylene adipamide), poly(4-oxaheptamethylene adipamide), and poly(4-oxa-2,6-dimethylmonomethylene adipamide).

Although nylon-6 has been incrementally improved as shown by the publications discussed above as examples, there remains a need for new polyamides having improved water absorbancy, but which retain the beneficial properties of the original polyamide materials, in this case, nylon-6.

Triethylene and tetraethylene glycol diamines may be continuously produced from glycols catalytically. The triethylene glycol diamine and tetraethylene glycol diamine products are known under the trade names JEFFAMINE® EDR-148 Amine and JEFFAMINE® EDR-192 Amine, respectively, as made by Texaco Chemical Co. These materials are useful as epoxy curing agents.

SUMMARY OF THE INVENTION

Accordingly, it is an object of the present invention to provide a nylon-6 material having improved water absorbancy, and/or which are soluble in water.

It is another object of the present invention to provide a novel nylon-6 polyamide made from very specific polyethylene glycol diamines and dicarboxylic acids.

Another object of the invention to provide a method for making the modified nylon-6 that is easily implemented.

In carrying out these and other objects of the invention, there is provided, in one form, modified nylon-6 produced by the process of first mixing a dicarboxylic acid, or esters thereof, with a relatively low molecular weight ethylene glycol diamine having the formula $NH_2-(CH_2CH_2O)_x-CH_2CH_2-NH_2$, where x ranges from 2 to 3, to form an intermediate; and then reacting the intermediate with $\epsilon$-caprolactam to form the modified nylon-6.

DETAILED DESCRIPTION OF THE INVENTION

It has been surprisingly discovered that nylon-6 may be modified to produce copolyamides having improved water absorption by the incorporation of only certain relatively low molecular weight polyethylene glycol diamines, such as JEFFAMINE® EDR amines, in particular triethylene glycol diamine and tetraethylene glycol diamine. Unexpectedly, not all low molecular weight materials are equally effective. For example, bis-aminoethyl ether (BAEE) differs from triethylene glycol diamine by only one $-(CH_2CH_2O)-$ group, but surprisingly gives weak fibers.

These novel copolyamides are useful in applications where good water absorption is desired, such as fabrics, where it is known that some incorporation of moisture is useful in reducing the tendency of the fabric to carry an undesirable static charge. Additionally, most of the modified nylon-6 materials are also quite flexible. The water absorption of the copolyamides increases with increasing polyethylene glycol amide content. The copolyamides can be made water soluble when the adipamide of the polyethylene glycol diamine is added in large amounts.

The novel polyether amides of this invention can probably be made according to a number of different reactions. Generally, $\epsilon$-caprolactam is reacted with the reaction product (including the salt thereof) of a dicarboxylic acid and an ethylene glycol diamine having the formula $NH_2-(CH_2CH_2O)_x-CH_2CH_2-NH_2$, where x ranges from only 2 to 3. The examples herein use the process where the diamine and the dibasic acid are mixed together to form a salt which is in turn reacted with $\epsilon$-caprolactam. The definition of "reacting" is meant herein to include the formation of these salts by mixing at room temperature or elevated temperatures. However, the diamine and the dibasic acid could be reacted to form a prepolymer, an amidoacid or an amidoamine, which would, in turn, be reacted with $\epsilon$-caprolactam to form the modified nylon-6.

The polyether amides of this invention must use the polyethylene glycol diamines having the formula $NH_2-(CH_2CH_2O)_x-CH_2CH_2-NH_2$, where x must range from 2 to 3. When x is 1, bis-aminoethyl ether (BAEE) is the diamine, and it was unexpectedly discovered that BAEE gave a poor product, in contrast to the case where x is 2 or 3. Specifically, weak fiber was obtained in the case where BAEE/terephthalic acid was used. It is possible that a side reaction, the cyclization of BAEE to morpholine occurred:

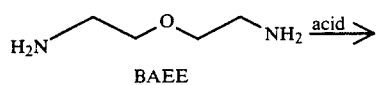
BAEE

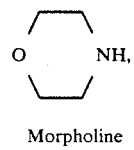
Morpholine although the exact problem is not positively known. In addition, the resulting copolyamides are relatively thermally unstable. The thermal gravimetric analysis showed significant weight losses at higher temperatures.

When x is 2 in the above formula, the diamine is triethylene glycol diamine, marketed as JEFFAMINE® EDR-148 amine, and when x is 3, the compound is tetraethylene glycol diamine, marketed as JEFFAMINE EDR-192 amine, both sold by Texaco Chemical Co. It is anticipated that other diamines may be used in conjunction with these diamines to give modified nylons within the scope of this invention. In particular, JEFFAMINE ED-Series amines (diterminal diamines of mixed polyoxypropylene and polyoxyethylene having a molecular weight of 600 or greater), which are commercially available products, may be considered as coreactants herein.

Some prior materials use only ED-Series-type amines. There are advantages to using the relatively lower molecular weight EDR amines over the ED-Series amines. The low molecular weight EDR amines can be distilled to produce a pure product, and pure products are important in nylon production; as contrasted with the ED-Series amines which cannot be distilled. Further, use of the EDR amines helps maintain the integrity of the original structure, giving materials having more predictable properties, as compared with those formed using the higher molecular weight ED-Series amines.

The other essential coreactant is the dicarboxylic acid, which may have the formula HOOC—R—COOH where R may be an alkyl or an aryl moiety having from 3 to 34 carbon atoms in one embodiment, in one aspect from 4 to 20 carbon atoms, and in a further aspect from 4 to 9. In another aspect of the invention, the dicarboxylic acid may be selected from the group including, but not necessarily limited to, adipic acid, pimelic acid, azelaic acid, sebacic acid, dodecanedioic acid, terephthalic acid, isophthalic acid, t-butyl isophthalic acid and mixtures thereof, which all fall within the formula definition. Adipic acid is a particularly preferred dicarboxylic acid. The esters of these acids may also be used.

As noted, the novel copolyamides may be made directly by contacting $\epsilon$-caprolactam with a salt of the ethylene glycol diamine and the dicarboxylic acid (kept in 1:1 mole ratio) in the presence of heat, from approximately 230° to about 280° C. as a narrower range, where a broad temperature range for this reaction is from about 200° to about 300° C. No catalyst is required for this reaction, although one may be yet discovered that might prove beneficial. The reaction may also be conducted at atmospheric pressure. The reaction is quite selective, yielding the modified nylon-6 materials in nearly quantitative yield. The products are generally light-colored solids. The produts and methods of this invention will be described in more detail with reference to the following examples.

EXAMPLES 1-12

General Procedure for the Preparation of Modified Nylon-6

To a test tube were added 3.001 g. of $\epsilon$-caprolactam, 0.595 g. of terephthalic acid/JEFFAMINE EDR-148 amine salt, and 2.0 g. of water. The test tube was placed into a glass reactor equipped with a nitrogen purging tube. The reactor was heated to 170° C. for 30 minutes, and then at 260° C. for five hours. A yellow, brittle solid was obtained. The product was pulled into fibers. In this manner, Examples 2 through 12 were also performed. The properties of the products from these Examples are given in Table I.

In general, the amount of water absorbed depends on both the amide content and the oxygen content. The water absorption of the copolyamides increases with increasing relative amount of salt charged. At the same weight ratio, the case of EDR-192 amine shows better water absorption than the case of EDR-148 amine because of the higher oxygen content in the case of the EDR-192 amine. In one aspect, the proportion of salt in the salt and $\epsilon$-caprolactam mixture ranges from about 5 to about 50, more preferably from about 10 to about 30.

TABLE I

Nylon-6 Modified with JEFFAMINE® EDR Amines

| Ex. | Modifier (content) | Properties | Wt. loss, %, $N_2/N_2$ 250° C. | 300° C. | 350° C. |
|---|---|---|---|---|---|
| 1 | Terephthalic acid/EDR-148 amine salt (16.5%) | Brittle solid, yellow, partially soluble in water; fiber drawn. | 5.6 | 7.5 | 12.0 |
| 2 | Terephthalic acid/EDR-192 amine salt (15.8%) | Brittle solid, yellow; fiber drawn. | 5.5 | 7.0 | 12.0 |
| 3 | Terephthalic acid/BAEE salt (15.6%) | Brittle solid, light yellow; weak fiber. | 4.0 | 6.0 | 10.0 |
| 4 | Adipic acid/BAEE salt (15.5%) | Hard elastomer solid, light yellow. | 5.2 | 7.0 | 9.5 |
| 5 | Adipic acid/EDR-192 amine salt (75%) | Brown, transparent elastomer; water soluble. | * | * | * |
| 6 | Adipic acid/EDR-192 amine salt (50%) | Transparent elastomer, light brown. | 6.0 | 7.0 | 8.0 |
| 7 | Adipic acid/EDR-192 amine salt (25%) | Yellow, tough elastomer fibers. | 5.0 | 6.0 | 7.0 |
| 8 | Adipic acid/EDR-192 amine salt (10%) | Hard elastomer, yellow; fiber drawn. | 12.0 | 13.5 | 15.0 |
| 9 | Adipic acid/EDR-148 amine salt (75%) | Elastomer, light brown, water soluble. | 1.5 | 2.5 | 3.5 |
| 10 | Adipic acid/EDR-148 amine salt (50%) | Yellow elastomer. | 4.0 | 5.0 | 6.0 |
| 11 | Adipic acid/EDR-148 amine salt (20%) | Hard elastomer, light yellow. | 7.0 | 7.0 | 11.0 |
| 12 | Adipic acid/EDR-148 amine salt (75%) | Hard solid, light yellow; fiber drawn. | 3.0 | 3.1 | 3.5 |

*Very moisture sensitive; no good sample was obtained.

Many modifications may be made in the process of this invention without departing from the spirit and scope thereof which are defined only in the appended claims. For example, one skilled in the art may discover that particular reaction conditions, sequences, companion diamines (those besides JEFFAMINE EDR-148 and -192), dicarboxylic acids, which may not be explicitly recited herein, but which are nevertheless anticipated, would give optimal or otherwise desirable results.

| GLOSSARY | |
|---|---|
| BAEE | bis-Aminoethyl ether |
| $\epsilon$-caprolactam | Also known as $\epsilon$-aminocaprolactam and caprolactam. |
| Jeffamine ® EDR-148 Amine | Triethylene glycol diamine made by Texaco Chemical Company. |
| Jeffamine ® EDR-192 Amine | Tetraethylene glycol diamine made by Texaco Chemical Company. |

We claim:

1. A modified nylon-6 produced by the process comprising the steps of:
   reacting a dicarboxylic acid, or an ester thereof, with an ethylene glycol diamine having the formula $NH_2-(CH_2CH_2O)_x-CH_2CH_2-NH_2$, where x ranges from 2 to 3, to form an intermediate; and
   reacting the intermediate with $\epsilon$-caprolactam to form the modified nylon-6.

2. The modified nylon-6 of claim 1 where the dicarboxylic acid has the formula HOOC—R—COOH, where R is an alkyl or aryl group having from about 3 to about 34 carbon atoms, or esters thereof.

3. The modified nylon-6 of claim 1 where the dicarboxylic acid is adipic acid.

4. The modified nylon-6 of claim 1 where the proportion of intermediate to total reactants ranges from about 5 to about 50%.

5. The modified nylon-6 of claim 1 where the proportion of intermediate to total reactants ranges from about 10 to about 30%.

6. The modified nylon-6 of claim 1 where reaction of the intermediate with $\epsilon$-caprolactam is conducted at a temperature in the range of about 200° to about 300° C.

7. A modified nylon-6 produced by the process comprising the steps of:
   mixing a dicarboxylic acid having the formula HOOC—R—COOH, where R is an alkyl or aryl group having from about 3 to about 34 carbon atoms, or esters thereof, with an ethylene glycol diamine having the formula $NH_2-(CH_2CH_2O)_x-CH_2CH_2-NH_2$, where x ranges from 2 to 3, to form a salt; and
   reacting the salt with $\epsilon$-caprolactam to form the modified nylon-6.

8. The modified nylon-6 of claim 7 where the dicarboxylic acid is adipic acid.

9. The modified nylon-6 of claim 7 where the proportion of salt to total reactants ranges from about 5 to about 50%.

10. The modified nylon-6 of claim 7 where the proportion of salt to total reactants ranges from about 10 to about 30%.

11. The modified nylon-6 of claim 7 where reaction of the salt with $\epsilon$-caprolactam is conducted at a temperature in the range of about 200° to about 300° C.

12. A modified nylon-6 produced by the process comprising the steps of:
    reacting adipic acid, or esters thereof, with an ethylene glycol diamine having the formula $NH_2-(CH_2CH_2O)_x-CH_2CH_2-NH_2$, where x ranges from 2 to 3 to form a salt; and
    reacting the salt with $\epsilon$-caprolactam to form the modified nylon-6, where the proportion of salt to total reactants ranges from about 10 to about 30%.

13. The modified nylon-6 of claim 12 where reaction of the salt with $\epsilon$-caprolactam is conducted at a temperature in the range of about 200° to about 300° C.

14. A method of making a modified nylon-6 produced comprising the steps of:
    mixing a dicarboxylic acid having the formula HOOC—R—COOH, where R is an alkyl or aryl group having from about 3 to about 34 carbon atoms, or esters thereof, with an ethylene glycol diamine having the formula $NH_2-(CH_2CH_2O)_x-CH_2CH_2-NH_2$, where x ranges from 2 to 3, to form a salt; and
    reacting the salt with $\epsilon$-caprolactam to form the modified nylon-6.

15. The method of claim 14 where the dicarboxylic acid is adipic acid.

16. The method of claim 14 where the proportion of salt to total reactants ranges from about 5 to about 50%.

17. The method of claim 14 where the proportion of salt to total reactants ranges from about 10 to about 30%.

18. The method of claim 14 where reaction of the salt with $\epsilon$-caprolactam is conducted at a temperature in the range of about 200° to about 300° C.

* * * * *